United States Patent
Kim et al.

(10) Patent No.: US 8,005,225 B2
(45) Date of Patent: Aug. 23, 2011

(54) HIERARCHICAL THRESHOLD TREE-BASED BROADCAST ENCRYPTION METHOD

(75) Inventors: Dae-youb Kim, Seoul (KR); Hwan-joon Kim, Seoul (KR); Sung-joon Park, Seoul (KR); Weon-il Jin, Suwon-si (KR); Dong-hoon Lee, Goyang-si (KR)

(73) Assignee: Samsung Electronics Co., Ltd., Suwon-si (KR)

( * ) Notice: Subject to any disclaimer, the term of this patent is extended or adjusted under 35 U.S.C. 154(b) by 1027 days.

(21) Appl. No.: 11/340,614

(22) Filed: Jan. 27, 2006

(65) Prior Publication Data

US 2007/0189539 A1    Aug. 16, 2007

(30) Foreign Application Priority Data

Feb. 25, 2005 (KR) .................. 10-2005-0015967

(51) Int. Cl.
*H04L 29/00* (2006.01)
(52) U.S. Cl. .................. 380/277; 380/278; 380/279
(58) Field of Classification Search .......... 380/277–286, 380/44–47, 30; 713/163
See application file for complete search history.

(56) References Cited

U.S. PATENT DOCUMENTS

| | | | | |
|---|---|---|---|---|
| 5,592,552 A * | 1/1997 | Fiat | ............................. | 713/163 |
| 6,359,986 B1 * | 3/2002 | Tatebayashi | .................. | 380/277 |
| 6,839,436 B1 * | 1/2005 | Garay et al. | .................. | 380/278 |
| 7,340,603 B2 * | 3/2008 | Asano | ............................. | 713/163 |
| 2003/0126299 A1 * | 7/2003 | Shah-Heydari | .............. | 709/252 |

OTHER PUBLICATIONS

Sandro, Rafaeli et al.: "A Survey of Key Management for Secure Group Communication", ACM Computing Surveys, vol. 35, No. 3, Sep. 2003, pp. 309-329.
Myungok Oh et al.: "The Design of Security Protocol for an Efficient Distribution and Renewal Method of Group Key", vol. 9-C, No. 3, pp. 0331-0336, Jun. 2006, Abstract only.

* cited by examiner

*Primary Examiner* — Vivek Srivastava
*Assistant Examiner* — Anthony Brown
(74) *Attorney, Agent, or Firm* — Sughrue Mion, PLLC

(57) ABSTRACT

A hierarchical threshold tree-based broadcast encryption method includes a first step for a server initialization and a user subscription, a second step of distributing a message to enable a privileged user (authorized user) to decrypt a group key, and a third step of the privileged user (authorized user) decrypting the message using the group key. According to the method, it is possible to prevent any group of revocators from obtaining the group key using their secret information and information being broadcast by the server.

11 Claims, 8 Drawing Sheets

FIG. 9
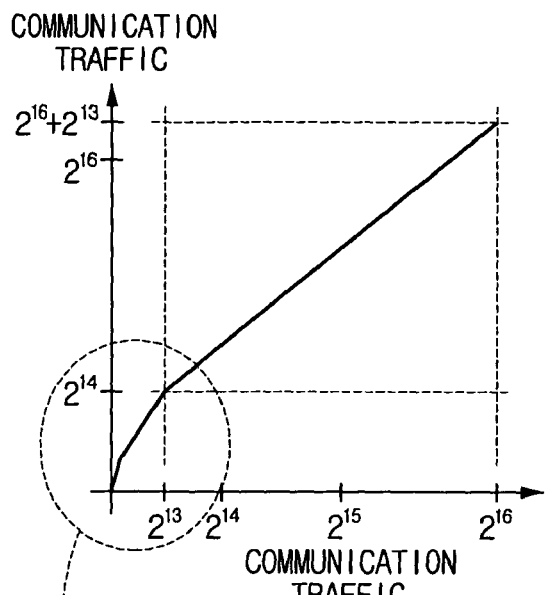
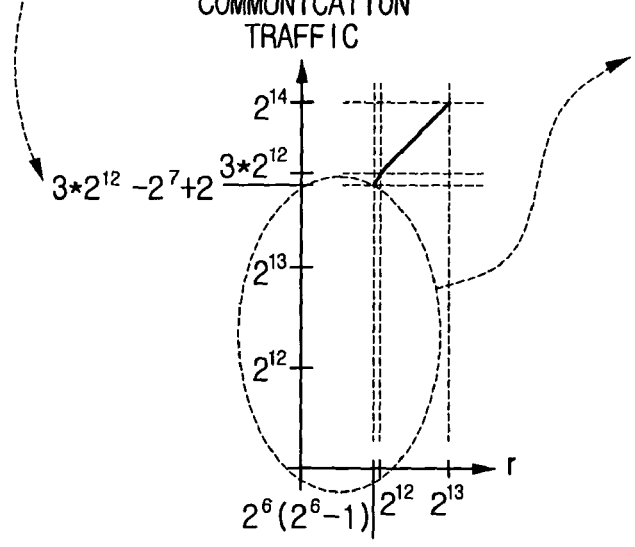
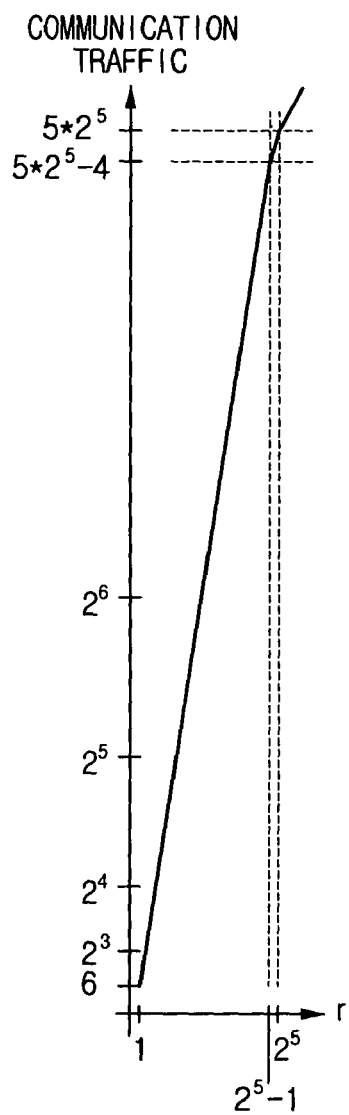

HIERARCHICAL THRESHOLD TREE-BASED BROADCAST ENCRYPTION METHOD

This application claims priority from Korean Patent Application No. 2005-15967, filed on Feb. 25, 2005, the entire content of which is incorporated herein by reference.

BACKGROUND OF THE INVENTION

1. Field of the Invention

Methods consistent with the present invention relate to broadcast encryption, and more particularly, to hierarchical threshold tree-based broadcast encryption which can improve the performance of a broadcast transmitting system and protect data against collusion attacks by revocators through a hierarchical use of a (t,n)-threshold technique.

2. Description of the Related Art

In general, there are two kinds of encryption systems that are distinguished depending on their encryption key management types: one is a symmetric cipher (or secret key) encryption system and the other is a non-symmetric cipher (or public key) encryption system. The symmetric cipher encryption system is an encryption method that had been mostly used before the public key encryption system came to existence. In the symmetric cipher encryption system, the same key is used for both the encryption and decryption. For example, in the case where a sender converts a plaintext message into a ciphertext through an encryption key and an encryption algorithm, and transmits the ciphertext to a recipient, the recipient may restore the ciphertext back to the original plaintext using a decryption algorithm having the same key used for the encryption algorithm.

In this case, the recipient should safely exchange the encryption key prior to a cryptographic communication. Thus, any third party, who intends to tap into the messages, cannot know the original plaintext unless the third party finds the key used by the sender and the recipient. However, the number of keys that should be managed is increased as the number of sender-recipient parties subject to encryption is increased, from which a number of problems in key management and exchange have arisen.

In comparison to the symmetric cipher encryption system, the non-symmetric cipher encryption system is based on mathematical function. The non-symmetric cipher encryption system has a pair of keys one of which is open to the public so that anyone can use it, and the other of which is secret. Here, the key open to the public is called a public key, and the secret key is called a private key.

In order to communicate between the sender and the recipient using the public key, the sender first encrypts a message with the public key of the recipient and transmits it to the recipient. The recipient obtains the plaintext of the message by decrypting the ciphertext with his/her private key. Even if someone has obtained the ciphertext through a network, the message can be safely transferred because he cannot decrypt the ciphertext without the private key of the recipient. The reason is that the private key is always kept secret by its owner and is not known or transmitted to anyone.

The symmetric cipher is widely used to encrypt/decrypt a broadcast stream because the encryption/decryption using the symmetric cipher can be performed very quickly and the symmetric cipher can be safely transferred through a limited access system that permits an access of privileged users (authorized users) only.

In a data transmission system using general broadcast encryption (BE), contents providers create various beneficial data including audio and video data, and provide the created data to service providers. Then, the service providers broadcast the data to rightful users (e.g., users of mobile digital right management (DRM) networks and smart home DRM networks) who have paid charges for the corresponding data through various kinds of wire/wireless communication networks.

FIG. 1 is a view illustrating a conventional broadcast transmission system. Referring to FIG. 1, a service provider 100 creates a broadcasting message 110 and transmits the message to respective users through various transmission channels 120. At this time, the broadcasting message is transmitted to not only privileged users 130 but also revoked users 140. Accordingly, the service provider 100 encrypts the broadcasting message by assigning individual keys to the users so that only the privileged users (authorized users) 130 can read the transmitted broadcasting messages. In this case, it has become an important issue in the broadcast system to create specified group keys with which only the privileged users (authorized users) 130 can decrypt the encrypted message.

For example, the service provider can transmit data to users' devices such as set-top boxes provided with various satellite receivers via a satellite, and transmit the data to mobile communication terminals through a mobile communication network. Also, the service provider can transmit the data to various terminals of smart home networks through the Internet.

In order to prevent the non-privileged users (unauthorized users) who have not paid the due charges for the corresponding data, the data is encrypted by a BE method.

Security in the encryption/decryption system generally depends on an encryption key management system. In the encryption key management system, an important aspect is how to derive encryption keys. Also, it is important to manage and update the derived encryption keys.

A data transmission method by the public key scheme is a data transmission method that includes key values for rightful users in data to be transmitted from the service provider to the users. That is, the data transmitted by the service provider through broadcast/home network is composed of a header part including authenticated information and an encrypted data part including actual data information. The header part includes a group ID and key value information of the privileged users (authorized users) corresponding to each authorized group so that the data is transmitted only to the users of the authorized group. Therefore, the data is encrypted by Certificate Revocation List (CRL) and Online Certificate Status Protocol (OCSP) including CRL and OCSP information, and the encrypted data is transmitted to the recipients. Then, the privileged users (authorized users) can use the data by confirming their key value information included in the header part of the received data and normally performing an authentication.

In the BE method, the header part includes only the group ID and key value information corresponding to the group. Therefore, the rightful users of the authorized group can normally decrypt the received data using their own group key value.

Another BE method is disclosed in "Broadcast Encryption" by Fiat, et al. (Crypto '93, LINCS vol. 839, pp 480-491, 1994) (hereinafter referred to as "Fiat algorithm"). This method has proposed two basic BE algorithms and an algorithm having an enhanced security against collusion attacks.

Now, the Fiat algorithm will be briefly explained. For the explanation of the Fiat algorithm, some coefficients are defined as follows:

U: Set of users with |U|=n
P: Set of privileged users with |U−P|=r
N: RSA composite
$y_1, \ldots, y_n$: Distinct primes
$usr_i$: A user in U where $1 \leq i \leq n$
O: A positive integer satisfying $1 \leq O \leq N$ The Fiat algorithm enables a server to create system coefficients N, $y_1, \ldots, y_n$, O of the defined coefficients, and N, $y_1, \ldots, y_n$ of the defined coefficients to be publicly disclosed to anyone to get access. Also, if user $usr_i$ subscribes to the service, the server performs the following process:

1. Assign value $y_i$ to the users $usr_i$.
2. Calculate secret information $u_i = O^{y_i}$ (mod N) of the user $usr_i$.
3. Safely transfer the calculated secret information to the user $usr_i$.

Initial setup and user subscription procedure are completed through the above process. Then, if privileged user (authorized user) group $P \subset U$ is given, group key $K_P$ for each user is set by Equation (1).

$$K_P = O^{\prod_{usr_s \in P} y_s} (\mod N) \quad (1)$$

At this time, each user included in P can calculate the group key $K_P$ of Equation (1) by Equation (2) using the value $u_i$ obtained from the server.

$$K_P = u_i^{\prod_{usr_s \in P \cdot (usr_i)} y_s} (\mod N) \quad (2)$$

Since non-privileged users (unauthorized users) or revocators have a prime number $y_i$, which is not included in the $K_P$, in the exponent of $u_i$, they cannot calculate the group key $K_P$ without removing the prime number $y_i$ from the exponent. This calculation is actually impossible due to the problem that 'the prime factorization of N is hard". Thus, the BE can be effectively done for the rightful user according to the above-mentioned method.

However, if two users, e.g., $usr_i$ and $usr_j$, share their secret information each other, serious problems may occur in the security of the Fiat algorithm. That is, since $y_i$ and $y_j$ are relatively prime, integers "a" and "b" satisfying a condition "$ay_i + by_j = 1$" can be easily obtained. Then, the two users can obtain the secret information "value O" of the system from Equation (3).

$$u_i^a u_j^b = O^{ay_i + by_j} = O (\mod N) \quad (3)$$

Therefore, the non-privileged users (unauthorized users) can obtain the group key $K_P$ from the "value O" in all cases. That is, if the two users act in collusion to obtain the secret information of the server that broadcasts contents, the security of the system can no longer be assured. The above system, which is secure from one attacker but is not secure from two or more attackers, is called a "1-resilient system." Although Fiat has proposed a "k-resilient system" based on the 1-resilient system, it is quite inefficient.

The k-resilient system is to remove a certain number of receivers (the number of receivers is "t" at maximum) which attempt to collude with each other. In the system, however, relatively long messages are required, relatively a large number of keys should be stored in the receivers, and each of the receivers should perform one or more decryption operations.

Further, the system does not consider a scenario of a state non-retaining receiver. It is necessary to avoid the difficulty of supposition as to how many receivers will collude with each other. Further, it is necessary to minimize the size of a message and the number of stored keys, and to minimize the decryption operations to be performed by the receivers in order to optimize the performance of the system.

Additionally, other encryption systems like the Fiat system do not provide a scenario of a state non-retaining receiver, and thus they cannot be effectively applied to the protection of contents in a recording medium.

SUMMARY OF THE INVENTION

The present invention provides a hierarchical threshold tree-based BE method that is safe from collusion attacks and can reduce transmission/storage/operation loads.

According to an aspect of the present invention, there is provided a hierarchical threshold tree-based BE method, according to the present invention, which comprises a first step for a server initialization and a user subscription; a second step of distributing a message to enable a privileged user (authorized user) to decrypt a group key; and a third step of the privileged user (authorized user) decrypting the message using the group key.

The first step may comprise the steps of constructing a tree with h levels to correspond to all users; dividing nodes of respective levels except level "0" of the tree into one or more sub-groups each of which includes w nodes; randomly creating node keys which correspond to the respective nodes of the tree except level "0"; creating random polynomials of the d-th degree which correspond to all the sub-groups of the respective levels except level "0" for each sub-group; creating shared values for restoring secret values of the d-th degree polynomials by replacing x with IDs of the respective nodes in the created d-th degree polynomials; and transmitting the created node keys and the shared values to the respective users.

Here, the first step may further comprise the step of storing the node keys and the shared values transmitted from the server as secret keys of the users.

The degree "d" of the d-th degree polynomials may be a value that satisfies a condition of $1 \leq d \leq w/2$.

The secret values may be obtained by replacing x with "0" in the d-th degree polynomials.

The second step may comprise the steps of creating the group key sk, constructing a Steiner tree by linking all the nodes which correspond to members belonging to a set R of revocators when the set R is given; calculating the number of nodes belonging to the Steiner tree for the respective sub-group $S_{1,j}$; creating the broadcasting messages using different encryption methods in accordance with which condition the number $I_{1,j}$ of nodes belonging to the Steiner tree satisfies between $1 \leq I_{1,j} \leq w/2$ and $I_{1,j} > w/2$; and transmitting the created broadcasting messages.

Here, the step of creating the broadcasting message may comprise the steps of creating a first ciphertext by encrypting the group key using the secret value of the d-th degree polynomial which corresponds to the respective sub-group if the number $I_{1,j}$ of nodes belonging to the Steiner tree satisfies a condition of $1 \leq I_{1,j} \leq w/2$; adding the shared value which corresponds to the respective sub-group and the first ciphertext to a first region of the broadcasting message; searching for a node that does not belong to the Steiner tree of the respective sub-group and creating a second ciphertext by encrypting the group key using the node key of the searched node if the number $I_{1,j}$ of nodes belonging to the Steiner tree satisfies a condition $I_{1,j} > w/2$; adding the second ciphertext to a second region of the broadcasting message; and creating a third ciphertext by encrypting the group key using the shared value located in the first part, the first ciphertext and the second ciphertext located in the second part, and creating the broadcasting message to be transmitted to the respective user by adding the created third ciphertext to a third region of the broadcasting message.

The third step may comprise the steps of confirming whether the shared ID corresponding to the shared value retained by the privileged user (authorized user) exists in the first region of the broadcasting message; if it is confirmed that the shared ID exists in the first part, restoring the secret value of the corresponding polynomial and decrypting the group key from the first ciphertext using the restored secret value; and decrypting the broadcasting message using the group key.

Here, it is desirable for the shared ID to be the information which lets known the shared value among the shared values retained by the user, that is to be used to restore the above secret value.

The secret value of the corresponding polynomial is restored using the shared value corresponding to the shared ID, the shared value retained by the user and a Lagrange polynomial.

The third step may further comprise the steps of searching for the corresponding node ID in the second region of the broadcasting message and decrypting the group key using the node key corresponding to the node ID if the shared ID corresponding to the shared value retained by the privileged user (authorized user) does not exist in the first region of the broadcasting message; and decrypting the broadcasting message using the group key.

Here, it is desirable for the above node ID to be the information which lets known to the user the node key that is to be used to decrypt the group key.

Now, coefficients used to explain the hierarchical threshold tree-based BE method according to an exemplary embodiment of the present invention are defined as follows:

N: Set of all users, the number of users being $|N|=n=2^a$.

R: Set of revocators, the number of revocators being $|R|=r$, where R is a subset of N.

$N_i$: Identifier of node i in the tree.

w: w of an assumed perfect w-ary tree.

h: Depth of tree, which is $h=\log_w n$.

l: The level of the tree; starts from the root where the level of the route is "0."

$S_{l,j}$: j-th sub-group corresponding to level l. ID of $S_{l,j}$ is denoted by $s_{l,j}$.

$f_{l,d}^{S_{l,j}}(x)$: d-th polynomial corresponding to level l, which corresponds to the j-th sub-group.

$k_{N_i}$: Node key corresponding to node $N_i$.

sk: Group key.

$F_K$: $[0,1]^* \to [0,1]^*$: Used to encrypt a message M and the group key sk. $F_K$ should be fast in its rate and the length of input values should not be expanded due to the encryption. The data and the key K may be XOR-gated as a simple implementing method.

$F_K^{-1}$: $[0,1]^* \to [0,1]^*$: Decryption function of $F_K$.

h: $[0,1]^* \to [0,1]^K$: Collision-resistance unidirectional hash function.

$$M_B = \begin{matrix} < [ID_{S_{i_l}}\|share_{i_l}\|F_{i_l(0)}(sk), \ldots, ID_{S_{l_m}}\|share_{i_m}\|F_{f_{i_m(0)}}(sk)] \\ ID_{k_{i_l}}\|F_{k_{i_l}}(sk), \ldots, F_{k_{i_m}}(sk)], F_{sk}(M) > . \end{matrix}$$

Broadcasting message transmitted by the server. $M_B$ may be briefly divided into three parts. The first region share$_i$ means a shared value used to restore the secret value $f_i(0)$ of the polynomial in the (t,n)-threshold scheme. $ID_{S_i}=h(l,d,s_{l,j})$ is an identifier that informs the members with which value the secret value should be restored among the shared values retained by the members. It is assumed that the number of share$_i$ is "m." $F_{f_i(0)}(sk)$ represents a ciphertext that encrypts the group key using the respective secret values $f_i(0)$ of the polynomial through the (t,n)-threshold scheme. Only the members having restored the secret value $f_i(0)$ can decrypt the group key from the ciphertext $F_{f_i(0)}(sk)$. The second region $F_{k_i}(sk)$ represents a ciphertext that encrypts the node key using the group keys. It is assumed that the number of the ciphertext transmitted is "k." $ID_{k_i}=h(N_i)$ is an identifier of the node key $k_i$ that informs the members which node key should be used for decryption. The third region is a region that encrypts the message M using the group key.

BRIEF DESCRIPTION OF THE DRAWINGS

The above aspects of the present invention will be more apparent by describing certain exemplary embodiments of the present invention with reference to the accompanying drawings, in which:

FIG. 9 is a view illustrating communication traffic according to the number of revocators according to an exemplary embodiment of the present invention.

DETAILED DESCRIPTION OF THE EXEMPLARY EMBODIMENTS

Figure 1:
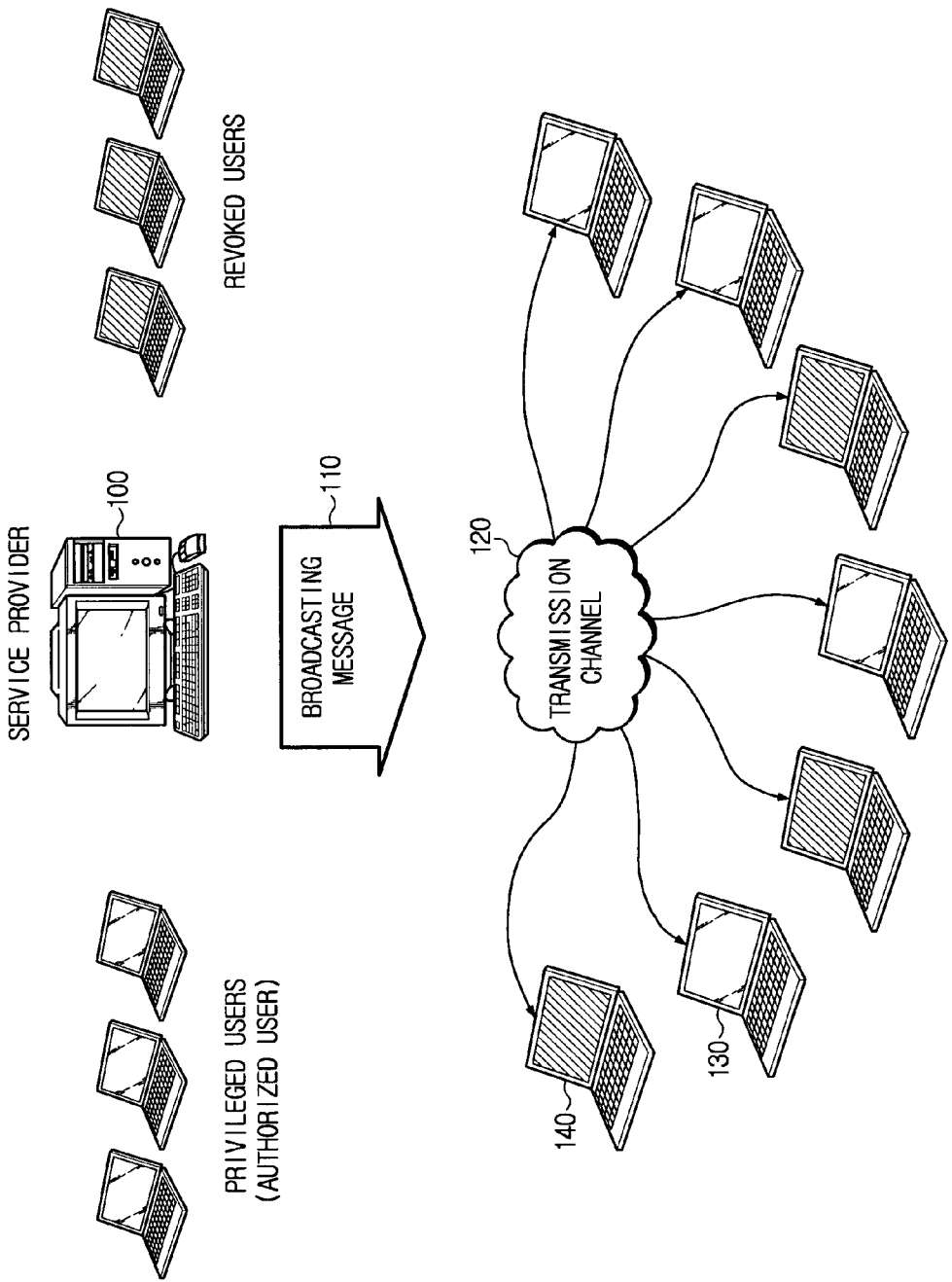
FIG. 1 is a view illustrating a general broadcast transmitting system.

Certain exemplary embodiments of the present invention will be described in greater detail with reference to the accompanying drawings.

In the following description, same drawing reference numerals are used for the same elements even in different drawings. The matters defined in the description such as a detailed construction and elements are nothing but the ones provided to assist in a comprehensive understanding of the invention. Thus, it is apparent that the present invention can be carried out without those defined matters. Also, well-known functions or constructions are not described in detail since they would obscure the invention in unnecessary detail.

Figure 2:
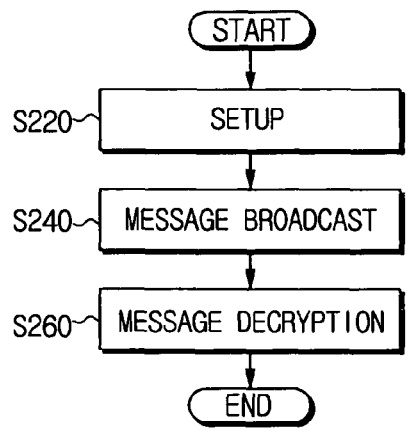
FIG. 2 is a flowchart illustrating a hierarchical threshold tree-based BE method according to an exemplary embodiment of the present invention.

FIG. 2 is a flowchart illustrating a hierarchical threshold tree-based BE method according to an exemplary embodiment of the present invention.

The hierarchical threshold tree-based BE method according to an exemplary embodiment of the present invention comprises a setup step S220 for a server initialization and a user subscription, a broadcast step S240 of distributing a message to enable a privileged user (authorized user) to decrypt a group key, and a decryption step S260 of the privileged user (authorized user) decrypting the message using the group key.

Figure 3:
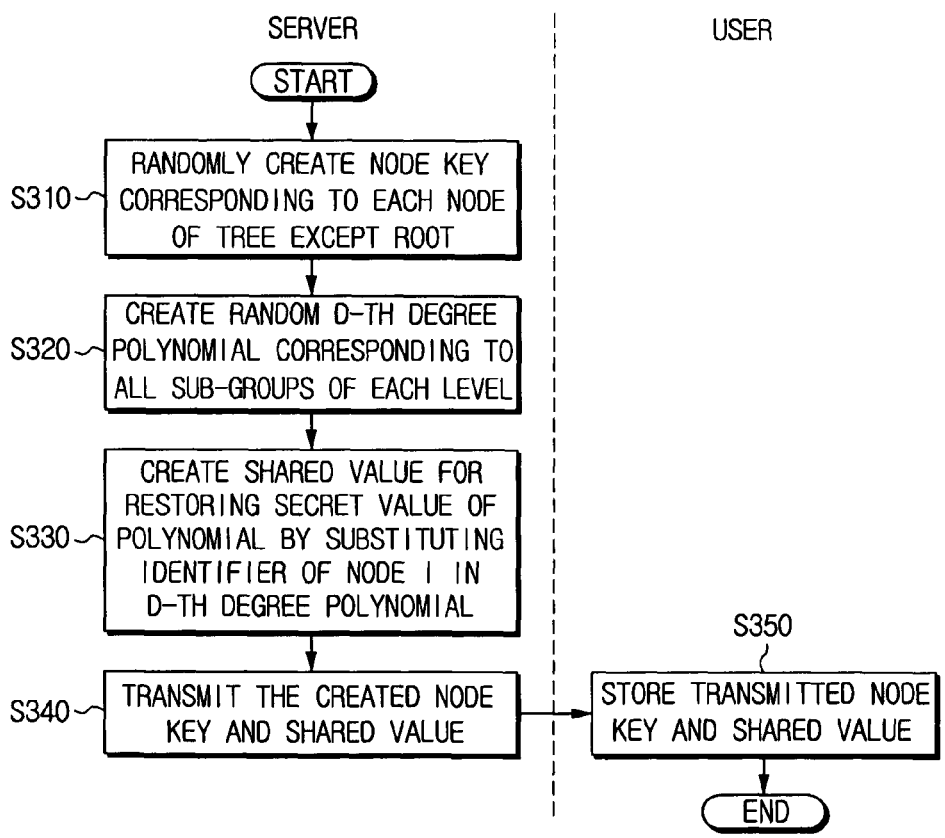
FIG. 3 is a flowchart illustrating in detail step S220 (e.g., setup step) of FIG. 2 according to an exemplary embodiment of the present invention.

First, the setup step for the server initialization and user subscription will be described with reference to the drawings. FIG. 3 is a flowchart illustrating the step S220 (e.g., setup step) of FIG. 2 in detail.

In the setup step, it is assumed that the key structure corresponding to all the users has a form of a perfect w-ary tree, and all the nodes of levels except level 0 (e.g.; root) are divided into sub-groups $S_{1,j}$ each of which has 4 nodes.

First, a server randomly creates a node key $k_{N_i}$ corresponding to each node of the tree except the root (S310). Then, the server creates random d-th degree polynomials $f_{l,d}^{S_{l,j}}(x)$ ($1 \leq d \leq w/2$) corresponding to all the sub-groups $S_{l,j}$ of each level l ($1 \leq l \leq h$) (S320).

The server creates a shared value $f_{l,d}^{S_{l,j}}(N_i)$ for restoring a secret value of the random d-th degree polynomial by replacing x with the identifier of node i, $N_i$, in the d-th degree polynomial, $f_{l,d}^{S_{l,j}}(x)$, created for each sub-group (S330).

Then, the server transmits the created node key and the shared value $f_{l,d}^{S_{l,j}}(N_i)$ to user $U_i$ through a secure channel (S340).

Each user $U_i$ stores two types of key values as the secret key. One type of the secret key is h node keys $k_{N_i}$ corresponding to leaf nodes from level 1 to level h.

The other type of the secret key stored by the user is h×(w/2) shared values $f_{l,d}^{S_{l,j}}(N_i)$. $f_{l,d}^{S_{l,j}}(N_i)$ is a shared value used to restore the secret value of the polynomial using a Shamir threshold scheme. Finally, the user should store the shared value because the group key is calculated by using the secret value of the polynomial.

When the setup step (S220) is completed as described above, the server performs the broadcast step (S240) for broadcasting a group key sk and a message M to privileged users (authorized users) as follows.

Figure 4:
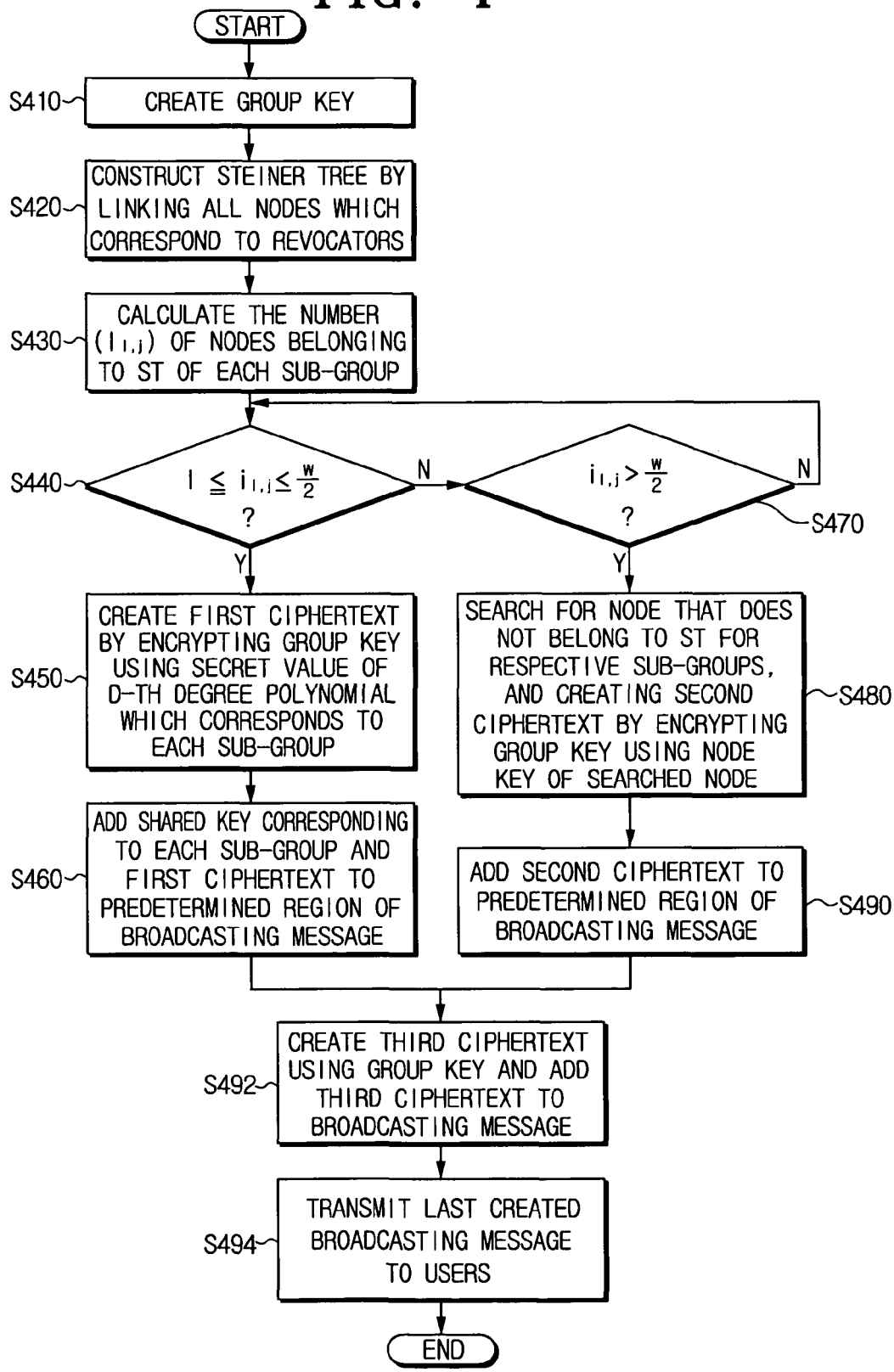
FIG. 4 is a flowchart illustrating in detail step S240 (e.g., message broadcast step) of FIG. 2 according to an exemplary embodiment of the present invention.

FIG. 4 is a flowchart illustrating step S240 of FIG. 2 in detail. Referring to FIG. 4, the server creates a group key sk (S410), and constructs a Steiner tree ST(R) by linking all the nodes which correspond to members belonging to the set R of revocators when the set R of the revocators is given (S420). If the construction of ST(R) is completed, the server performs the following steps for all the sub-groups $S_{l,j}$ belonging to the respective level of the tree.

First, the server calculates the number $I_{l,j}$ of nodes belonging to ST(R) of each sub-group $S_{l,j}$ (S430). When the calculated number $I_{l,j}$ of nodes belonging to ST(R) satisfies $1 \leq I_{l,j} \leq w/2$ (S440), the server creates a first ciphertext $f_{l,d}^{S_{l,j}}(sk)$ by encrypting the group key sk using the secret value $f_{l,d}^{S_{l,j}}(0)$ of the d-th degree polynomial which corresponds to each sub-group $S_{l,j}$ (450). The first ciphertext $f_{l,d}^{S_{l,j}}(sk)$ is expressed by Equation (4).

$$f_{l,d}^{S_{l,j}}(sk) = f_{l,d}^{S_{l,j}}(0) \oplus sk \quad (4)$$

The server adds the shared key $f_{l,d}^{S_{l,j}}(N_i)$ corresponding to each sub-group and the first ciphertext $f_{l,d}^{S_{l,j}}(sk)$ to a first region $$[ID_{S_{i_l}} \| share_{i_l} \| F_{f_{i_l(0)}}(sk), \ldots , ID_{S_{i_m}} \| share_{i_m} \| F_{f_{i_m(0)}}(sk)]$$

of the broadcasting message $M_B$ (460). As an identifier to inform a member of the shared value among the shared values retained by the member, used to recover the secret value, the $ID_{S_i}$ represents $h(l,d,s_{l,j})$ here.

Meanwhile, if the calculated number $I_{l,j}$ of nodes belonging to ST(R) satisfies the condition $I_{l,j} > w/2$ (S470), the server searches for a node that does not belong to ST(R) for all the sub-groups $S_{l,j}$ satisfying the condition $I_{l,j} > w/2$, and creates a second ciphertext $$F_{k_{N_i}}(sk)$$

by encrypting the group key sk using the node key of the searched node (480). Then, the server adds the created second ciphertext $$F_{k_{N_i}}(sk)$$

to a second region $$ID_{k_{i_l}} \| F_{k_{i_l}}(sk), \ldots , F_{k_{i_k}}(sk)$$

of the broadcasting message $M_B$ (S490). As an identifier of node key $K_i$ used to decrypt the group key, $ID_{k_i}$ represents $h(N_i)$ here.

Then, the server creates a third ciphertext $F_{sk}(M)$ by encrypting the message to be transmitted using the group key sk (S492).

The server completes the message broadcast step after transmitting the resultant broadcasting message $M_B$ created according to the above method to the users (S494).

Last, the third step that is a message decryption step is performed. After each user $U_i$ receives the broadcasting message M from the server, the user obtains the group key sk and decrypts the message $M_B$ through the following method.

Figure 5:
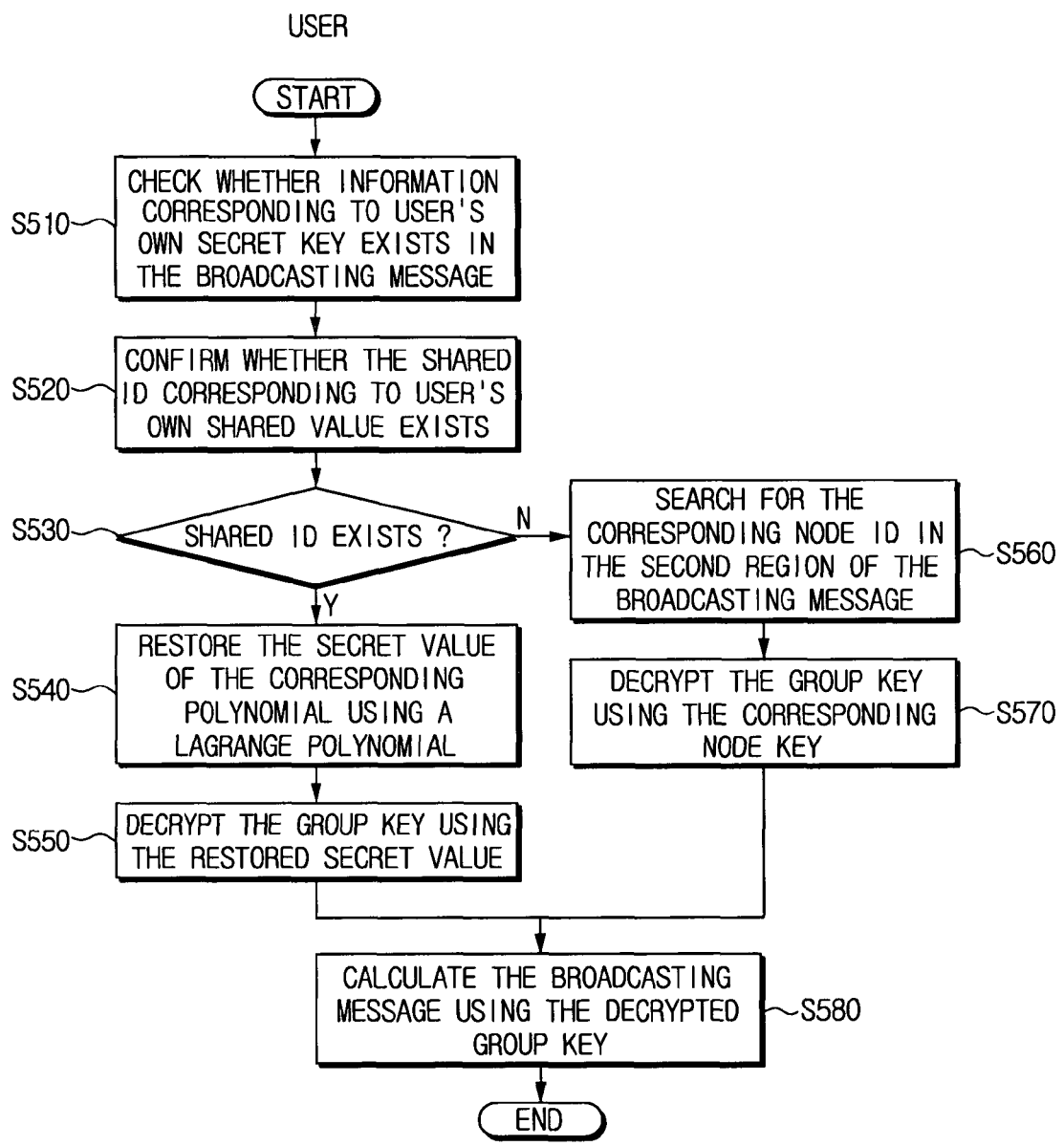
FIG. 5 is a flowchart illustrating in detail step S260 (e.g., message decryption step) of FIG. 2 according to an exemplary embodiment of the present invention.

FIG. 5 is a flowchart illustrating step S260 of FIG. 2 in detail. Referring to FIG. 5, a privileged user (authorized user) $U_i$ who does not belong to the set of revocators checks whether information corresponding to his/her own secret key exists in the broadcasting message (S510).

First, the user confirms whether the shared ID corresponding to his/her own shared value exists in the first region $$[ID_{S_{i_l}} \| share_{i_l} \| F_{f_{i_l(0)}}(sk), \ldots , ID_{S_{i_m}} \| share_{i_m} \| F_{f_{i_m(0)}}(sk)]$$

of the broadcasting message (S520). Upon confirming that the shared ID exists in the first region (S530), the user restores the secret value of the corresponding polynomial using a Lagrange polynomial with his/her own shared value and the corresponding shared value (S540).

After the applicable polynomial is restored, the user decrypts the group key sk from a first ciphertext $F_{f_i(0)}(sk)$ (S550).

If the shared ID corresponding to his/her own shared value does not exist in the first region $$[ID_{S_{i_l}}\|share_{i_l}\|F_{f_{i_l}(0)}(sk), \ldots, ID_{S_{i_m}}\|share_{i_m}\|F_{f_{i_m}(0)}(sk)]$$

of the broadcasting message (S530), the user searches for the corresponding node ID in the second region $$[ID_{k_{i_l}}\|F_{k_{i_l}}(sk), \ldots, F_{k_{i_m}}(sk)]$$

of the broadcasting message (S560). Then, the group key sk is decrypted using the node key corresponding to the searched node (S570).

Last, the broadcasting message $M_B$ is calculated using the decrypted group key (S580). That is, the broadcasting message $M_B$ is calculated from $F_{sk}^{-1}(F_{sk}(M))$.

To aid the understanding of the present invention, the hierarchical threshold tree-based BE method according to an exemplary embodiment of the present invention will be explained under the assumption that $|N|=n=2^6$, $|R|=r=5$, $w=2^2$.

1. Setup Step

Figure 6:
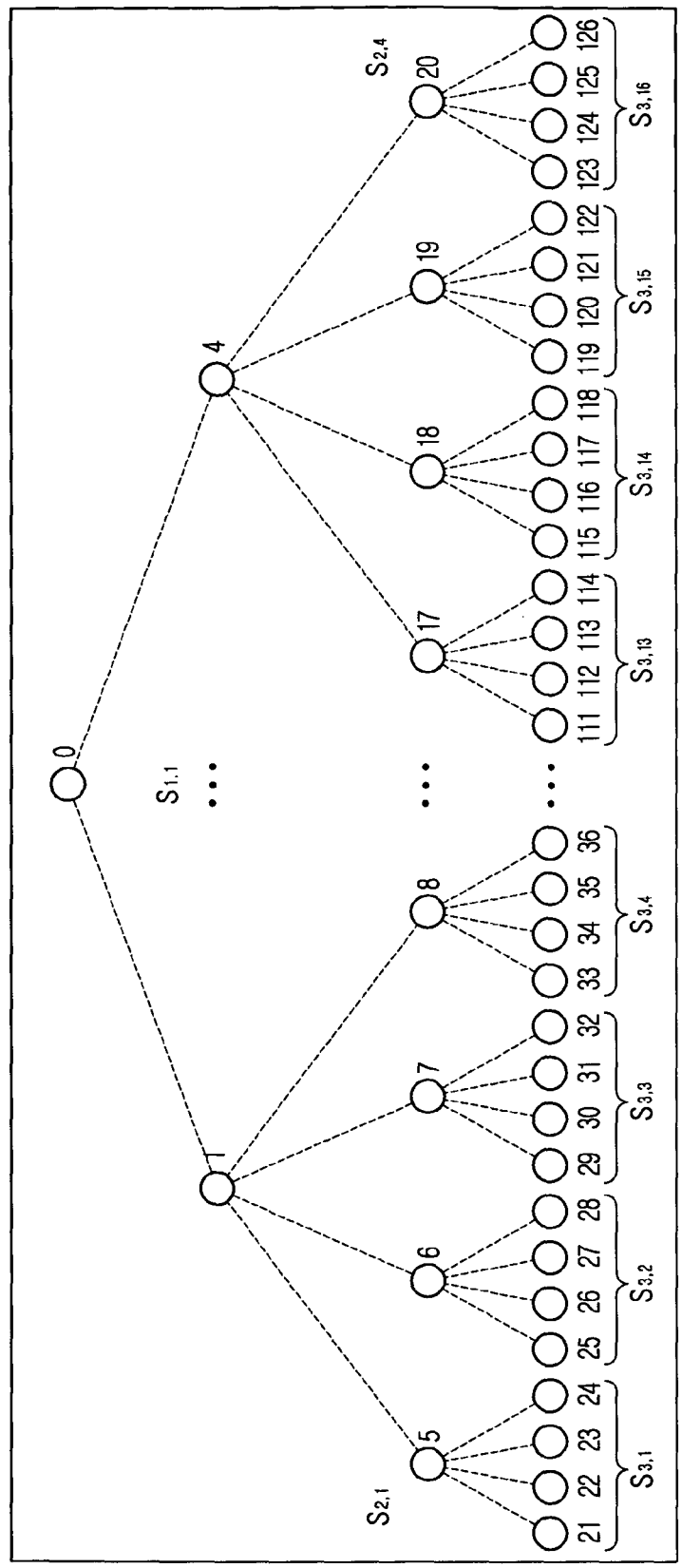
FIG. 6 is a view illustrating a form of sub-group $S_{1,j}$ created when $|N|=n=2^6$ and $w=2^2$ according to an exemplary embodiment of the present invention.

FIG. 6 is a view illustrating the form of the sub-group $S_{l,j}$ created when $|N|=n=2^6$, $w=2^2$. Referring to FIG. 6, the key structure corresponding to all the members has the form of a perfect 4-ary tree. The nodes of levels except level 0 are divided into sub-groups each of which has 4 nodes.

The server randomly creates node keys $k_{N_i}$ corresponding to respective nodes of the tree except the root. Then, the server creates 6 ($=h\times(w/2)=3\times2$) random polynomials $f_{l,d}^{S_{l,j}}(x)$ corresponding to the sub-groups $S_{l,j}$ of each level l ($1\leq l\leq3$), where the d-th degree is the first or second degree.

Then, the server creates shared values $f_{l,d}^{S_{l,j}}(N_i)$ for restoring secret values of the respective polynomials by replacing x with the identifier of node i, $N_i$, in the created 6 random polynomials. Then, the server transmits the created node keys $k_{N_i}$ and the created shared values $f_{l,d}^{S_{l,j}}(N_i)$ to users $U_i$ through secure channels. Here, $f_{l,d}^{S_{l,j}}(N_i)$ denotes shared values of the (t,n)-threshold tree.

Each user $U_i$ stores three node keys $k_{N_i}$ corresponding to the nodes from level 1 to level 3 as the first type of the secret key and $h\times(w/2)$ shared values $f_{l,d}^{S_{l,j}}(N_i)$ as the second type of the secret key.

Figure 7:
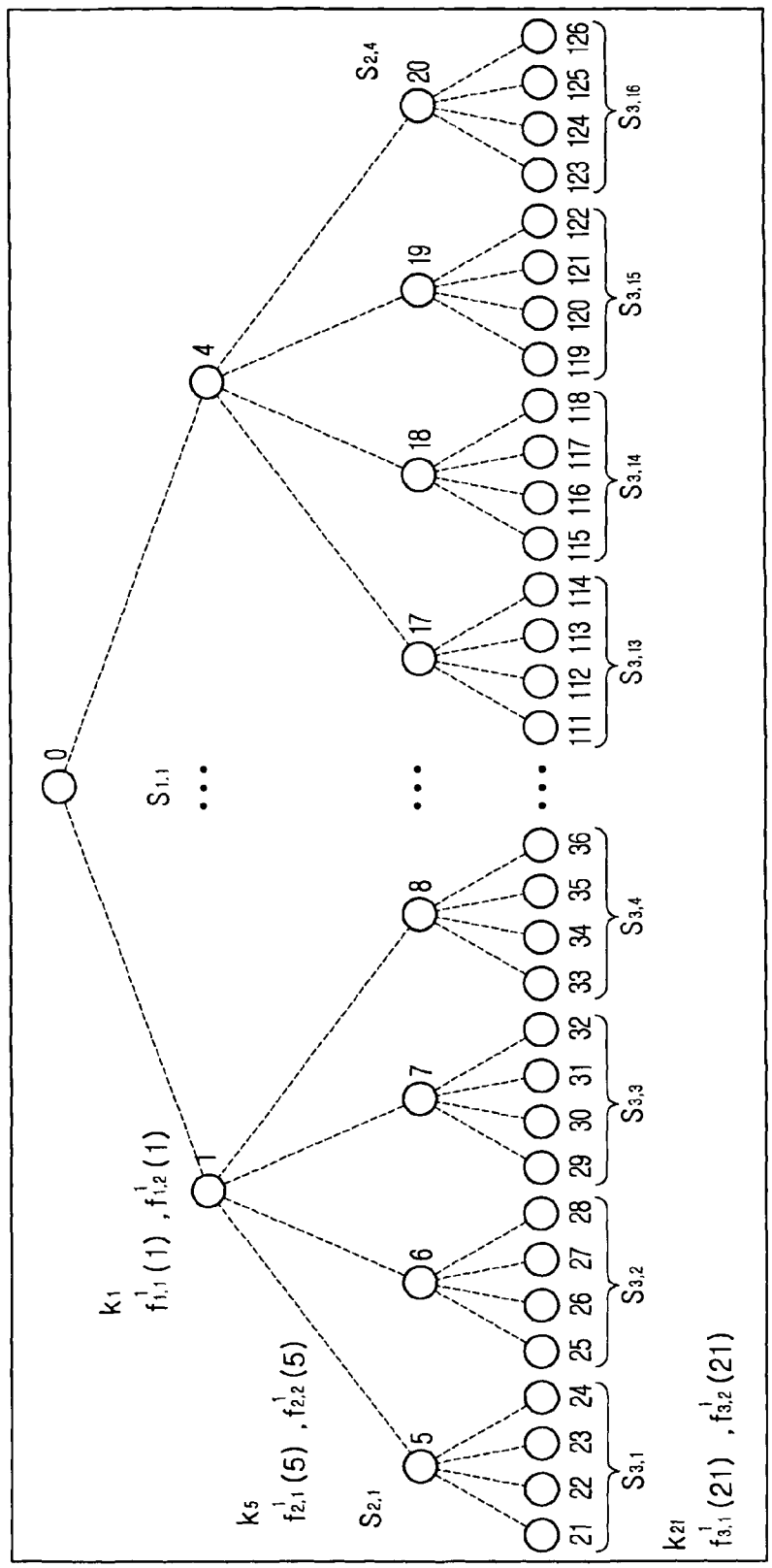
FIG. 7 is a view illustrating a type of a key retained by user $U_{21}$ as illustrated in FIG. 6 according to an exemplary embodiment of the present invention.

In this exemplary embodiment, only the key information to be retained by the user $U_{21}$ will be explained without losing the general property of the invention. FIG. 7 is a view illustrating a key type retained by user $U_{21}$ as shown in FIG. 6. Referring to FIG. 7, user $U_{21}$ stores three node key values k1, k5, k21 and six shared values $f_{1,1}^1(1)$, $f_{1,2}^1(1)$; $f_{2,1}^1(5)$, $f_{2,2}^1(5)$; $f_{3,1}^1(21)$, $f_{3,2}^1(21)$ corresponding to three sub-groups $S_{l,j}$ from level 1 to level 3.

2. Message Broadcasting Step

The server performs a process of broadcasting the group key sk and the message M to a privileged user (authorized user).

Figure 8:
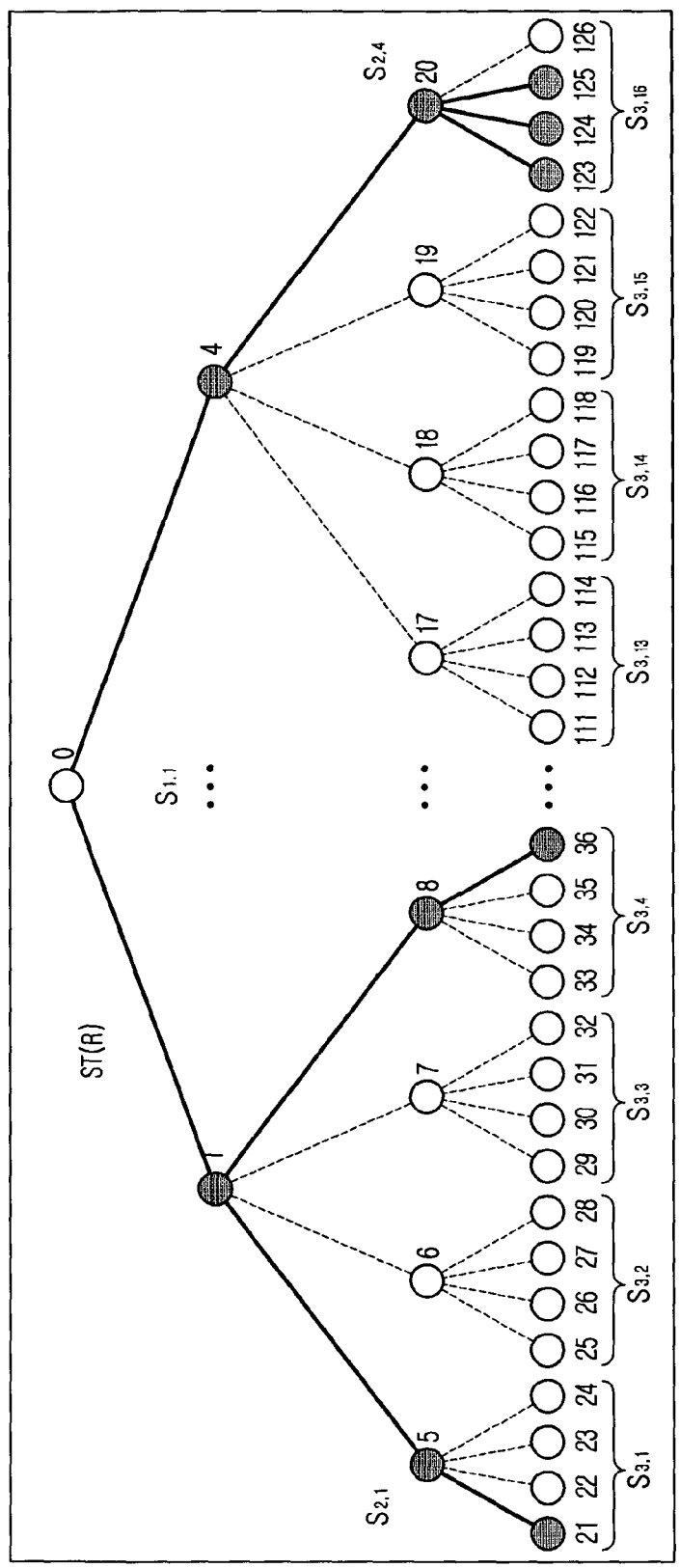
FIG. 8 is a view illustrating a Steiner tree constructed when a set R of revocators is $\{U_{21}, U_{36}, U_{123}, U_{124}, U_{125}\}$ according to an exemplary embodiment of the present invention.

First, the server creates the group key (sk). If a set of revocators is given by $\{U_{21}, U_{36}, U_{123}, U_{124}, U_{125}\}$, the server constructs a Steiner tree ST(R) by linking all the nodes which correspond to the members belonging to the set R of revocators. FIG. 8 is a view illustrating a Steiner tree constructed in the case where a set R of revocators is $\{U_{21}, U_{36}, U_{123}, U_{124}, U_{125}\}$. When the Steiner tree is constructed, the server performs the following steps for all the sub-groups $S_{l,j}$ belonging to the levels 1 to 3 of the tree.

The server calculates the number $I_{l,j}$ of nodes belonging to ST(R) of each sub-group $S_{l,j}$. Regarding all the sub-groups $S_{l,j}$ belonging to each level shown in FIG. 8, the number of nodes belonging to ST(R) is given as follows:

level1→[$S_{1,1}$: 2]
level2→[$S_{2,1}$: 2, $S_{2,2}$~$S_{2,3}$: 0, $S_{2,4}$: 1]
level3→[$S_{3,1}$: 1, $S_{3,2}$~$S_{3,3}$: 0, $S_{3,4}$: 1, $S_{3,5}$~$S_{3,15}$: 0, $S_{3,16}$: 3]

Then, the server checks which condition the calculated number $I_{l,j}$ of nodes satisfies between $1\leq I_{l,j}\leq w/2$ and $I_{l,j}>w/2$. In this exemplary embodiment, since $w=4$, the sub-groups satisfying the condition of $1\leq I_{l,j}\leq w/2$ are $S_{1,1}$, $S_{2,1}$, $S_{2,4}$, $S_{3,1}$, $S_{3,4}$, and the sub-group satisfying the condition of $I_{l,j}>2$ is $S_{3,16}$.

First, the server performs a broadcasting message creating process for the sub-groups satisfying $1\leq I_{l,j}\leq w/2$, as follows.

The server encrypts a shared value $f_{1,2}^1(1)$ of the $2^{nd}$ degree polynomial corresponding to $S_{1,1}$ and a polynomial's secret value $f_{1,2}^1(0)$ using the group key sk, and then adds the encrypted value $f_{1,2}^1(0)\oplus$ sk to a first region of the broadcasting message $M_B$.

Similarly, the server encrypts two shared values $f_{2,2}^1(5)$ and $f_{2,2}^1(8)$ of the $2^{nd}$ degree polynomial corresponding to $S_{2,1}$ and the polynomial's secret value $f_{2,2}^1(0)$ using the group key sk, and then adds the encrypted value $f_{2,2}^1(0)\oplus$ sk to the first region of the broadcasting message $M_B$.

Also, the server encrypts a shared value $f_{2,1}^4(20)$ of the $1^{st}$ degree polynomial corresponding to $S_{2,4}$ and a polynomial's secret value $f_{2,1}^4(0)$ using the group key sk, and then adds the encrypted value $f_{2,1}^4(0)\oplus$ sk to the first region of the broadcasting message $M_B$.

Also, the server encrypts a shared value $f_{3,1}^1(21)$ of the $1^{st}$ degree polynomial corresponding to $S_{3,1}$ and a polynomial's secret value $f_{3,1}^1(0)$ using the group key sk, and then adds the encrypted value $f_{3,1}^1(0)\oplus$ sk to the first region of the broadcasting message $M_B$.

Also, the server encrypts a shared value $f_{3,1}^4(36)$ of the $1^{st}$ degree polynomial corresponding to $S_{3,4}$ and a polynomial's secret value $f_{3,1}^4(0)$ using group key sk, and then adds the encrypted value $f_{3,1}^4(0)\oplus$ sk to the first region of the broadcasting message $M_B$.

Meanwhile, the server performs the following broadcasting message creating process for the sub-group satisfying the condition of $I_{l,j}>2$. That is, the server searches for a node satisfying the condition of $I_{l,j}>2$, which does not belong to ST(R) of each sub-group, encrypts the group key sk using the node key corresponding to the searched node, and then adds the encrypted value to a second region of the broadcasting message $M_B$.

In this exemplary embodiment, the sub-group satisfying the condition of $I_{l,j}>2$ is $S_{3,16}$. Referring to FIG. 8, the server searches for a node 126 ($N_{126}$) that does not belong to ST(R) of sub-group $S_{3,16}$, encrypts the group key sk using the node key $k_{126}$ of the node 126 ($N_{126}$), and then adds the encrypted value $k_{126}\oplus$ sk to the second region of the broadcasting message $M_B$.

If the first and second regions of the broadcasting message $M_B$ have been constructed as above, the server creates the encrypted value M⊕sk of the message M using the group key (sk), adds the encrypted value to the broadcasting message, creates the resultant broadcasting message, and then broadcasts the resultant broadcasting message to the user.

In this exemplary embodiment, the resulting broadcasting message which is last created is given as follows:

$$MB = <[h(1,2,1)\|f_{1,2}^1(1)\|f_{1,2}^1(0 \oplus sk\|h(1,2,4)\|f_{1,2}^4(4)\|\\
f_{1,2}^4(0) \oplus sk\|h(2,2,1)\|f_{2,2}^1(5)\|f_{2,2}^1(8)\|f_{2,2}^1(0)\\
\oplus sk\|h(2,1,4)\|f_{2,1}^4(20)\|f_{1,2}^4(0) \oplus sk\|h(3,1,1)\|f_{3,1}^1\\
(21)\|f_{3,1}^1(0) \oplus sk\|h(3,1,4)\|f_{3,1}^4(36)\|f_{3,1}^4(0) \oplus sk],\\
[h(126)\|k_{126} \oplus sk], M \oplus SK \leq$$

3. Message Decryption Step

If the broadcasting message is received from the server, the user obtains the group key sk, and decrypts the message through the following method.

First, referring to FIG. 8, each privileged user (authorized user) $U_i\{U_{22}, \ldots, U_{35}, U_{37}, \ldots, U_{122}, U_{126}\}$, who does not belong to the set of revocators, checks whether information corresponding to his/her own secret key exists in the broadcasting message from the server. Each user $\{U_{22}, U_{23}, U_{24}\}$ restores a secret value $f_{3,1}^1(0)$ of the $1^{st}$ degree polynomial by calculating a Lagrange polynomial using a shared value $f_{3,1}^1(21)$ corresponding to a shared ID h(3,1,1) in the broadcasting message $M_B$ and his/her own shared values $f_{3,1}^1(22)$, $f_{3,1}^1(23)$, $f_{3,1}^1(24)$. Then, the user decrypts the group key sk from the third region $f_{3,1}^1(0) \oplus$ sk of the broadcasting message $M_B$ using the restored secret value $h(3,1,1)\|f_{3,1}^1(21)\|f_{2,2}^1(8)\|f_{3,1}^1(0 \oplus sk\|h(3,1,4)\|f_{3,1}^4(36)\|f_{3,1}^4(0) \oplus sk]$, $[h(126)\|k_{126} \oplus sk], M \oplus SK>$ of the $1^{st}$ degree polynomial.

User $\{U_{25}, \ldots, U_{32}\}$ restores a secret value $f_{2,2}^1(0)$ of the $2^{nd}$ degree polynomial using shared values $f_{2,2}^1(5)$, $f_{2,2}^1(8)$ corresponding to a shared ID h(2,2,1) in the broadcasting message $M_B$ and his/her own shared values $f_{2,2}^1(6)$, $f_{2,2}^1(7)$, and decrypts the group key sk using the restored secret value.

Also, user $\{U_{33}, \ldots, U_{35}\}$ decrypts the group key sk using a shared value $f_{3,1}^4(36)$ corresponding to a shared ID h(3,1,4) in broadcasting message $M_B$ and his/her own shared values $f_{3,1}^4(33)$, $f_{3,1}^4(34)$, $f_{3,1}^4(35)$. And also, the user $\{U_{37}, \ldots, U_{110}\}$ and the user $\{U_{111}, \ldots, U_{122}\}$ calculate the group key sk as described above.

Since the shared ID corresponding to user $U_{126}$ does not exist the first region $<h(1,2,1)\|, \ldots, h(3,1,4)\|f_{3,1}^4(36)\|f_{3,1}^4(0) \oplus sk>$ of the broadcasting message, user $U_{126}$ searches for a node ID corresponding to the second region $[h(126)\|k_{126} \oplus sk]$ of the broadcasting message, decrypts the group key sk using the node key $k_{126}$ of the corresponding node.

When the group key decryption process is completed, the privileged user (authorized user) $\{U_{22}, \ldots, U_{35}, U_{37}, \ldots, U_{122}, U_{126}\}$ decrypts the message received from the server using $F_{sk}^{-1}(F_{sk}(M))$.

FIG. 9 is a view illustrating communication traffic according to the number of revocators. Referring to FIG. 9, in the hierarchical threshold tree-based BE method according to an exemplary embodiment of the present invention, if the total number of users N is $N=2^{20}$ and the maximum number of revocators R is $R=2^{16}$, the communication traffic transmitted by the server is as follows.

If one user is withdrawn at an initial state, six messages are needed. If one more user is withdrawn, only one message is added at minimum, but five messages are added for the worst. As described above, it is required to add five messages for each additional revocator until the condition of $1 < r$ (the number of revocators)$< 2^5$ is satisfied. Therefore, if $1 < r < 25$, the communication traffic becomes $5r+1$. However, if $r=2^5$, only four messages are added, thereby resulting in $5 \cdot 2^5$ of the communication traffic. Also, If $2^5 < r < 2^6(2^6-1)$, three messages are added for each additional revocator, thereby resulting in $3r+2^6$ of the communication traffic.

If one user is withdrawn in a state that $2^6(2^6-1) < r < 2^6 \cdot 2^6$, two messages are added at maximum, thereby resulting in $2r+2^{12}$ of the communication traffic. Last, if $2^{12} < r \leq 2^{16}$, one message is increased, which follows an equation $r+2^{13}$ that has a slope of 1 and a constant of $2^{13}$. As a result, if the revocators are maximum, e.g., $r=2^{16}$, the communication traffic becomes $2^{16}+2^{13}$, which is considered as 1.125r for the sake of convenience.

Table 1 below shows communication traffic, user's storage amount and an amount of calculation required for the user to decrypt the message in the hierarchical threshold tree-based BE method according to an exemplary embodiment of the present invention.

TABLE 1

| Communication Traffic (r = $2^{16}$) | User's Storage Amount | Amount of Calculation (128 bits) | | |
|---|---|---|---|---|
| | | Multiplication | Division | Search |
| 1.125r | 2.4 Kbytes | 63 | 63 | 0(log(n)) |

As described above, according to an exemplary embodiment of the present invention, it is possible to prevent any group of privileged users (authorized users) from obtaining secret information of the server using secret information of the respective users and information being broadcast by the server. Also, it is possible to prevent any group of revocators from obtaining the group key using their secret information and information being broadcast by the server.

The foregoing exemplary embodiment and advantages are merely exemplary and are not to be construed as limiting the present invention. The present teaching can be readily applied to other types of apparatuses. Also, the description of the exemplary embodiments of the present invention is intended to be illustrative, and not to limit the scope of the claims, and many alternatives, modifications, and variations will be apparent to those skilled in the art.

What is claimed is:

1. A hierarchical threshold tree-based broadcast encryption method comprising:

subscribing users by a server;

distributing by the server, a message to enable a privileged user to decrypt a group key; and decrypting, by a privileged device corresponding to the privileged user, the message using the group key, wherein the subscribing the users comprises:

constructing, by the server, a tree with h levels, the tree including all users;

dividing, by the server, each of nodes at all levels except a node at level "0" of the tree into corresponding one or more sub-groups, each of the one or more sub-groups including w nodes;

randomly creating, by the server, node keys corresponding to the respective nodes of the tree except the node at the level "0";

creating, by the server, random polynomials of a d-th degree for corresponding sub-groups at all the levels except the level "0";

creating, by the server, shared values which restores secret values of the d-th degree polynomials by using identifiers (IDs) of the respective nodes in the created random polynomials of the d-th degree; and transmitting, by the server, the created node keys and the shared values to the respective users, wherein the identifiers inform a member of a shared value among the shared values retained by the member, and wherein the shared value is used to recover a corresponding secret value, and wherein the distributing the message comprises selecting one of two encryption methods in accordance with a number of nodes belonging to a Steiner tree constructed by linking all nodes corresponding to given revocators, creating broadcast messages using the selected encryption method, and transmitting the created broadcast messages.

2. The method as claimed in claim 1, wherein the subscribing the users further comprises storing the node keys and the shared values transmitted from the server as secret keys of the respective users.

3. The method as claimed in claim 1, wherein the degree "d" of the random polynomials of the d-th degree corresponds to a value that satisfies a condition of $1<d<w/2$.

4. The method as claimed in claim 1, wherein the secret values are obtained by replacing x with "0" in the random polynomials of the d-th degree.

5. The method as claimed in claim 1, wherein the distributing the message further comprises:
creating the group key, constructing the Steiner tree by linking all nodes corresponding to the given revocators; and
calculating the number of nodes $I1,j$ belonging to the Steiner tree for a sub-group $S1,j$,
wherein j belonging to the Steiner tree satisfies one of $1 \leq I1,j \leq w/2$ and $I1,j > w/2$.

6. The method as claimed in claim 5, wherein the creating the broadcast message comprises:
creating a first ciphertext by encrypting the group key using a secret value of a random polynomial of the d-th degree of the sub-group $S1,j$ if the number of nodes $I1,j$ belonging to the Steiner tree satisfies the condition of $1 \leq I1, j \leq w/2$;
adding a shared value of the sub-group $S1,j$ and the first ciphertext to a first region of the broadcasting message;
searching for a node that does not belong to the Steiner tree of the sub-group $S1,j$ and creating a second ciphertext by encrypting the group key using a node key of the searched node not belonging to the Steiner tree if the number of nodes $I1,j$ belonging to the Steiner tree satisfies the condition $I1,j > w/2$;
adding the second ciphertext to a second region of the broadcast message; and
creating a third ciphertext by encrypting the group key using the shared value located in the first part, the first ciphertext and the second ciphertext located in the second part, and creating the broadcast message to be transmitted to the respective user by adding the created third ciphertext to a third region of the broadcast message.

7. The method as claimed in claim 1, wherein the decrypting, by the privileged user, the message comprises:
confirming whether a shared identifier (ID) corresponding to a shared value retained by the privileged user exists in a first region of the message;
if it is confirmed that the shared ID exists in the first region, restoring a secret value of a corresponding random polynomial of the d-th degree and decrypting the group key from a first ciphertext using the restored secret value; and
decrypting the message using the group key.

8. The method as claimed in claim 7, wherein the shared ID corresponds to information which informs the privileged user of the shared value among shared values retained by the privileged user which restores the secret value.

9. The method as claimed in claim 7, wherein the secret value of the corresponding random polynomial of the d-th degree is restored using the shared value retained by the privileged user, corresponding to the shared ID and a Lagrange polynomial.

10. The method as claimed in claim 7, further comprising:
searching for a corresponding node ID in the second region of the broadcast message and decrypting the group key using a node key corresponding to the node ID if the shared ID corresponding to the shared value is retained by the privileged user does not exist in the first region of the broadcast message; and
decrypting the broadcast message using the group key.

11. The method as claimed in claim 10, wherein the node ID corresponds to information which informs the privileged user of the node key for decrypting the group key.

* * * * *